Dec. 24, 1963     A. ROTH     3,114,969
METHOD AND STRUCTURE FOR ASSEMBLING FLEXIBLE TUBING
WITHIN A BORE, AND JOINT PRODUCED THEREBY
Filed Jan. 27, 1959
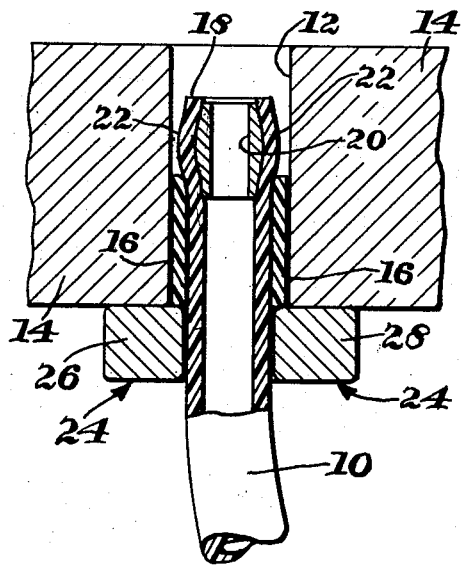
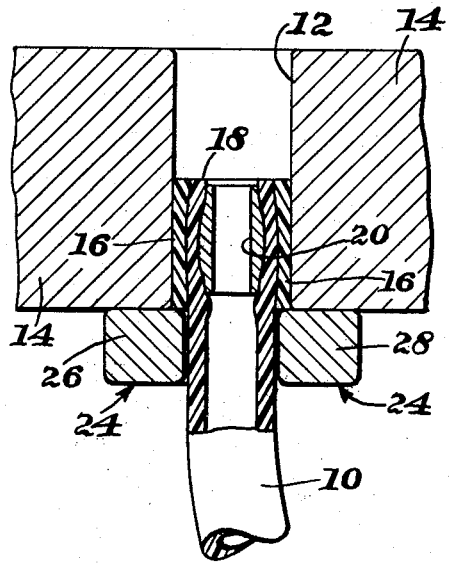
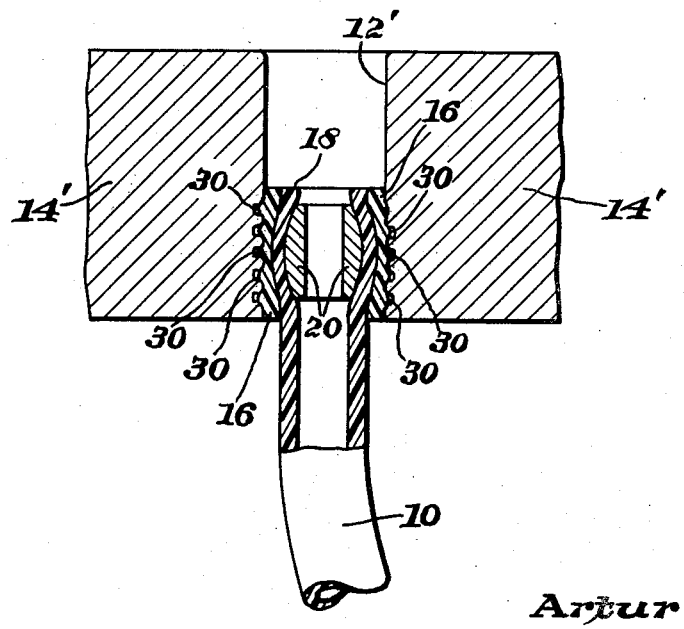
INVENTOR:
Artur Roth,
BY Cushman, Darby & Cushman
ATTORNEYS.

United States Patent Office 3,114,969
Patented Dec. 24, 1963

3,114,969
METHOD AND STRUCTURE FOR ASSEMBLING FLEXIBLE TUBING WITHIN A BORE, AND JOINT PRODUCED THEREBY
Artur Roth, Philadelphia, Pa., assignor to Lanston Industries, Incorporated, Philadelphia, Pa., a corporation of Virginia
Filed Jan. 27, 1959, Ser. No. 789,402
2 Claims. (Cl. 29—450)

This invention relates to methods and structures for assembling flexible tubings within bores of rigid or relatively rigid members. The invention also relates to fluid-tight joints.

Heretofore, it has been proposed to connect or couple flexible tubings, such as plastic tubings, in a fluid-tight manner within the bore or socket of a fitting made of a more rigid material, such as metal. Usually, previously suggested procedures have required a coupling nut or the like which has to be screwed onto the fitting to retain the end of the tubing within the bore in the fitting, and also, in some cases, to effect deformation of the walls of the flexible tubing in order that a fluid-tight joint may be produced. This deformation of the walls of the plastic tubing, in such procedures, is typically accomplished by a cam action between a rigid insert on the end of the tubing, and a cam surface on the coupling nut and/or fitting. As is evident, such procedures cannot be utilized where the use of a coupling nut is not desired or is actually precluded by the nature of the structure to which the tubing is to be attached. Furthermore, due to the required cam surface referred to, the bore in the fitting generally requires some special forming or machining to provide this cam surface. In other words, the bore in the fitting generally cannot be made inexpensively of simple, substantially uniform diameter.

Other proposed procedures for connecting flexible tubing, such as plastic, to metal fittings or the like require that an end of the tubing be solvent welded to a more rigid plastic collar, the collar being sealingly engaged in a recess in the metal fitting and retained therein between a flange either on the coupling nut or the fitting and a shoulder spaced therefrom in the recess. While such procedures for the structures utilized are advantageous for their intended purposes, it will be observed that once again a coupling nut or the like is also required and, further, there is an additional welding step to be performed in connection with securing the plastic tubing to the collar.

In contrast to these prior art practices, the present invention is mainly concerned with the connection of flexible tubings, such as plastic tubing, in a fluid-tight joint within a bore of a more rigid member, wherein the bore may desirably be of substantially uniform diameter, and wherein the use of a coupling nut or welding operation, such as required in prior art practices, referred to above, may be avoided. The invention is particularly, although not exclusively, applicable where a number of flexible tubings are to be connected in fluid-tight joints within a plurality of bores in a rigid, plate-like member. By way of example, it has been found that the invention greatly simplifies assembly of the many flexible tubings used for conveying fluid under pressure in keyboard composing machines, such as those described and referred to in U.S. Patent No. 944,405, and in machines constituting improvements thereof.

Accordingly, an important object of the invention is to provide a novel method and structure facilitating assembly of a flexible tubing in a fluid-tight joint within a bore or socket of a more rigid member. A related object is to provide such a method and structure particularly adapted to enable the flexible tubing to be connected within a bore of substantially constant diameter and without requiring the use of a coupling nut or a welding operation.

A further object resides in the provision of novel structure at the end of a flexible tubing, such as a plastic tubing, whereby this end of the tubing may be inserted within a bore of substantially constant diameter in a rigid member and be retained therein in a fluid-tight joint by the simple expedient of partially withdrawing the tubing from the bore while other structure at the end of the tubing is held stationary within the bore. In the preferred embodiments of the invention, to be discussed in more detail hereinbelow, it will be seen that the fluid-tight joint so produced may be conveniently released to permit complete removal of the tubing from the bore, if desired.

Another object of the invention is to provide a novel mechanically strong and firm fluid-tight joint between a flexible tubing and a bore in a rigid member, whereby the joint may be produced in a simple, expeditious and inexpensive manner involving a minimum of parts and procedures, and without requiring any particular skill on the part of the operator.

In accordance with the preferred embodiments of the invention, as will be described in more detail hereinafter, it is contemplated that there be provided, in combination with a flexible tubing, means for securing the tubing within a bore in a rigid member wherein said means includes: a flexible sleeve disposed about the tubing adjacent one end thereof; a stiff annular insert disposed within the tubing at said one end and of a larger outer diameter than the inner diameter of the tubing whereby an annular bulge is produced in the tubing axially outwardly of the sleeve. The end of the tubing with this structure thereon is then inserted within a bore in a rigid member, and the side walls of the tubing and the sleeve are then compressed between the insert and the rigid walls of the bore. This compressing of the walls of the tubing and the sleeve is effected by holding the sleeve in this bore against movement while the tubing is partially withdrawn from the bore until the insert is generally opposite the sleeve whereby the walls of the sleeve and the tubing will be compressed between the insert and the rigid walls of the bore to provide the desired mechanically strong, fluid-tight joint.

The final joint, in the preferred embodiments, thus comprises the flexible tubing and the surrounding flexible sleeve, compressed in thickness between a rigid insert within the tubing and the rigid walls of the bore. As will be appreciated, the diameters of these respective elements will be so chosen that the desired compression or reduction in thickness of the walls of the flexible tubing and the flexible sleeve will take place, as referred to.

Further objects and advantages of the invention will be in part obvious and in part pointed out hereinafter.

The novel features of the invention may be best made clear from the following description and accompanying drawings in which:

FIGURE 1 is a longitudinal sectional view showing means embodying the invention and associated with an end of a flexible tubing, this end of the tubing illustrated as being disposed in a bore of a rigid member, just prior to the final operation of forming the fluid-tight joint;

FIGURE 2 is a view corresponding to FIGURE 1 and showing the final fluid-tight joint produced according to the invention, and just prior to removal of a tool used in assembling the joint; and FIGURE 3 is a view corresponding to FIGURE 2, with the tool removed, and showing a modified bore construction.

Referring now to the drawings, and in particular FIGURES 1 and 2, numeral 10 designates a flexible tubing intended to be connected in a fluid-tight joint within a bore 12 of a rigid member 14. The rigid member 14 may be a coupling or a fitting or any other structure having a bore (or bores) therein to which it is desired to secure a flexible tubing (or tubings) in a fluid-tight joint (or joints), as hereinafter described in more detail.

The tubing 10 will be made of any suitable flexible material, such as plastic or rubber. By way of example, the tubing may be made of polyethylene, neoprene or a vinyl plastic, such as vinyl chloride-vinyl acetate. One such vinyl plastic that may be used is referred to in the trade as "Tygon."

The member 14 may be made of metal or some other material preferably substantially more rigid than the flexible tubing 10. And, in the illustrative embodiment shown in the drawings, the bore 12 is of substantially constant or uniform diameter throughout.

A flexible sleeve 16 is disposed around the tubing 10 adjacent and axially inwardly of one end 18 thereof, and a stiff annular insert 20 is fitted within this end of the tubing, as indicated in FIGURE 1, prior to inserting this end of the tubing within the bore 12. The flexible sleeve 16 may be of the same material as the tubing 10, and preferably is of an inner diameter slightly greater than the outer diameter of the tubing 10, and of an outer diameter slightly smaller than the diameter of the bore 12 whereby this sleeve will be disposed somewhat loosely about the tubing 10, yet be adapted to be conveniently inserted within the bore 12, in the position indicated in FIGURE 1.

The insert 20, by way of example, may be made of metal, such as brass, and is provided with a maximum outer diameter greater than the inner diameter of the tubing 10 whereby an annular bulge 22 will be formed in the end 18 of the tubing, axially outwardly of the sleeve 16 when the insert is fitted within the tubing, as shown in FIGURE 1. In the exemplary configuration of FIGURES 1 and 2, this insert is illustrated as having a somewhat barrel-shaped external surface, although other external surfaces for this element may be utilized provided they are capable of producing the annular bulge 22. However, in order to facilitate the initial insertion of element 20 within the tubing, at least one end of element 20 preferably is formed so that its external surface converges.

After the insert 20 and sleeve 16 have been engaged to the tubing 10, in the manner indicated in FIGURE 1, this end 18 of the tubing is then inserted within the bore 12 so that the sleeve 16 preferably is disposed wholly therewithin, as indicated. At this time, a suitable tool 24 is disposed adjacent the bottom of the sleeve 16 in engagement therewith and also with the rigid member 14 in surrounding or partially surrounding relation to the tubing 10, as indicated in FIGURE 1, so as to retain the sleeve 16 within the bore 12.

The tubing 10 is then appropriately pulled downwardly, as by hand, partially through the sleeve 16 and the bore 12 until the insert 20 is generally opposite to the sleeve 16, for example, as indicated in FIGURE 2. At this time, the walls of the tubing 10 and sleeve 16 will be compressed or reduced in thickness between the rigid insert 20 and the rigid walls of the bore 12 so as to form a firm and mechanically strong fluid-tight joint between the tubing 10 and the rigid walls of the bore 12.

After the joint has been so formed, the tool 24 will be removed. This tool may be of any construction suitable for the purpose of retaining the sleeve 16 within the bore 12, while permitting the tubing 10 to be pulled partially through the sleeve and bore 12, as described. By way of example, the tool 24 may be a pair of conventional pliers, having its jaws 26, 28 arranged in the manner indicated in FIGURES 1 and 2.

FIGURE 3 illustrates a joint formed according to the invention, for example, in the manner just described, and is substantially identical to the joint shown in FIGURE 2, except that the bore in the rigid member is of modified form. Corresponding parts in FIGURES 2 and 3 are identified by similar numerals. In FIGURE 3, the lower portion of the bore 12' is shown as being provided with circumferential grooves 30. These may be formed as separate, annular grooves or they may be formed as a continuous spiral or helix, such as threads. In this arrangement, when the tubing 10' and insert 20' are moved into their final position in the bore 12', to compress the tubing 10' and sleeve 16', as in the aforedescribed embodiment, the sleeve 16' will at least partially enter the grooves 30, as indicated in the drawing. Thus, the sleeve 16' will be more firmly and securely retained in the bore 12', and the sealing action between the sleeve and the walls of the bore 12' will also be enhanced.

As has been referred to heretofore, the dimensions and diameters of the various parts involved, namely, the insert 20, the tubing 10, the sleeve 16 and the bore 12 will be so chosen that when the final joint is formed as described, the transverse distance between the side walls of bore 12 and the maximum diameter of insert 20 will be sufficiently less than the combined thickness of the sleeve 16 and tubing 10, when the latter are in their normal condition, that there will be reduction in the thickness of tubing 10 and sleeve 16 to make the final joint fluid tight and mechanically strong. Additionally, due to the nature and structure involved in this joint, it may be disassembled, if desired, by pulling the tubing 10 completely out of the bore 12, and with a much stronger force than that required to initially form the joint in going from the step shown in FIGURE 1 to that shown in FIGURE 2. The amount of pull required to disassemble the joint is sufficiently greater than that required in initially forming the joint to effectively assure that the joint will be properly formed by the technique described and that it can only be disassembled intentionally and with more pressure than that to which the joint will be subjected during use.

The present invention will thus be seen to completely and effectively accomplish the objects enumerated hereinabove. It will be realized, however, that various changes and substitutions may be made to the specific embodiments disclosed herein for the purpose of illustrating the principles of this invention, without departing from these principles. Therefore, this invention includes all modifications encompassed within the spirit and scope of the following claims.

I claim:

1. A method of connecting one end of a length of flexible tubing in fluid-tight relation within an opening formed in a generally rigid member which comprises the steps of engaging within the one end of said flexible tubing a relatively rigid annular insert including a portion having an exterior dimension greater than the interior dimension of said tubing to thereby expand the local exterior dimension of said tubing to a value less than the dimension of said opening, effecting a relative axial movement in one direction between the opening of said member and said one tubing end with said insert engaged therein to dispose said tubing end with said insert engaged therein within said opening, effecting a relative axial movement in said one direction between the opening of said member and a flexible sleeve of an interior dimension slightly greater than the exterior dimension of said tubing and an exterior dimension slightly less than the dimension of said opening to dispose said sleeve within said opening in surrounding relation to said tubing at a position spaced from said insert portion inwardly of said tubing from said one end thereof and then effecting a relative axial movement in the opposite direction between said tubing and insert and said sleeve and member to dispose said insert portion at a position within said sleeve whereby the expanded one end of said tubing serves to expand said sleeve, maintain the exterior of the tubing in fluid-tight engagement with the interior of said sleeve and maintain the exterior of said sleeve into fluid-tight engagement with said opening.

2. A method of connecting one end of a length of flexible tubing in fluid-tight relation within an opening in a generally rigid member with the use of a relatively rigid annular insert including a portion having an exterior dimension greater than the interior dimension of said tubing but less than the dimension of said opening minus twice the dimension of the wall thickness of said tubing and a relatively flexible sleeve having an interior dimension slightly greater than the exterior dimension of said tubing and an exterior dimension slightly less than the dimension of said opening which comprises the steps of moving said sleeve onto said tubing into a position spaced inwardly from said one end thereof, engaging said insert within said one tubing end into a position wherein said portion thereof is spaced from said sleeve in a direction toward the one end of said tubing, pushing said one tubing end with said insert and sleeve positioned thereon within said opening to dispose said sleeve therein and subsequently pulling said tubing in a direction outwardly of said opening while preventing outward movement of said sleeve to dispose said insert portion in a position within said sleeve whereby the expanded one end of said tubing serves to expand said sleeve, maintain the exterior of the tubing in fluid-tight engagement with the interior of said sleeve and maintain the exterior of said sleeve into fluid-tight engagement within said sleeve.

References Cited in the file of this patent

UNITED STATES PATENTS

| | | |
|---|---|---|
| 1,461,130 | Loughead | July 10, 1923 |
| 1,668,978 | Rhinevault | May 8, 1928 |
| 2,175,412 | Rodman | Oct. 10, 1939 |
| 2,261,500 | Lewis et al. | Nov. 4, 1941 |
| 2,390,501 | Abrams | Dec. 11, 1945 |
| 2,398,041 | Russell | Apr. 9, 1946 |
| 2,584,044 | Osrow | Jan. 29, 1952 |
| 2,616,729 | Hansen | Nov. 4, 1952 |
| 2,701,147 | Summerville | Feb. 1, 1955 |
| 2,770,476 | Cleverly | Nov. 13, 1956 |
| 2,849,201 | Schelguno | Aug. 26, 1958 |
| 2,871,553 | Binder | Feb. 3, 1959 |
| 2,874,981 | Brady | Feb. 24, 1959 |
| 2,880,018 | Robinson et al. | Mar. 31, 1959 |
| 2,955,504 | Lourinch et al. | Oct. 11, 1960 |

FOREIGN PATENTS

| | | |
|---|---|---|
| 548,919 | Belgium | July 14, 1956 |
| 202,955 | Australia | Aug. 7, 1956 |